United States Patent
Blair et al.

(10) Patent No.: US 9,344,439 B2
(45) Date of Patent: May 17, 2016

(54) EXECUTING UNPROTECTED MODE SERVICES IN A PROTECTED MODE ENVIRONMENT

(71) Applicant: The Boeing Company, Chicago, IL (US)

(72) Inventors: Richard N. Blair, Kent, WA (US); Winfeng Li, Renton, WA (US); Arun Ayyagari, Seattle, WA (US); Lester L. Houston, III, Florissant, MO (US)

(73) Assignee: The Boeing Company, Chicago, IL (US)

(*) Notice: Subject to any disclaimer, the term of this patent is extended or adjusted under 35 U.S.C. 154(b) by 175 days.

(21) Appl. No.: 14/159,127

(22) Filed: Jan. 20, 2014

(65) Prior Publication Data

US 2015/0207805 A1 Jul. 23, 2015

(51) Int. Cl.
| | |
|---|---|
| *H04L 9/32* | (2006.01) |
| *H04L 29/06* | (2006.01) |
| *G06F 21/53* | (2013.01) |
| *G06F 21/57* | (2013.01) |

(52) U.S. Cl.
CPC .............. *H04L 63/126* (2013.01); *G06F 21/53* (2013.01); *G06F 21/57* (2013.01); *H04L 9/3247* (2013.01); *H04L 2209/72* (2013.01)

(58) Field of Classification Search
CPC ..... G06F 21/53; G06F 21/57; H04L 2209/72; H04L 63/126; H04L 9/3247
USPC ............................................ 713/176; 726/26
See application file for complete search history.

(56) References Cited

U.S. PATENT DOCUMENTS

| | | | |
|---|---|---|---|
| 6,247,127 B1 | 6/2001 | Vandergeest | |
| 7,039,801 B2* | 5/2006 | Narin | G06F 21/53 713/152 |
| 8,327,131 B1 | 12/2012 | Hardjono et al. | |
| 8,479,292 B1* | 7/2013 | Linhardt | H04L 63/1441 713/1 |
| 8,732,474 B1* | 5/2014 | Perry | G06F 21/53 713/156 |
| 9,021,246 B2* | 4/2015 | Baltes | G06F 21/57 380/273 |
| 2003/0027550 A1 | 2/2003 | Rockwell | |
| 2003/0188165 A1* | 10/2003 | Sutton, II | G06F 21/57 713/716 |
| 2004/0039937 A1* | 2/2004 | Aissi | G06F 21/57 726/6 |
| 2005/0149726 A1* | 7/2005 | Joshi | G06F 21/51 713/164 |
| 2005/0260973 A1 | 11/2005 | van de Groenendaal | |
| 2007/0143629 A1* | 6/2007 | Hardjono | H04L 63/0823 713/189 |
| 2009/0204823 A1* | 8/2009 | Giordano | G06F 11/3648 713/190 |
| 2009/0205032 A1 | 8/2009 | Hinton et al. | |
| 2009/0228704 A1* | 9/2009 | de Atley | G06F 8/20 713/156 |
| 2009/0265756 A1 | 10/2009 | Zhang et al. | |

(Continued)

OTHER PUBLICATIONS

U.S. Appl. No. 13/975,936, filed Aug. 26, 2013.

(Continued)

*Primary Examiner* — Samson Lemma
(74) *Attorney, Agent, or Firm* — Kunzler Law Group, PC

(57) ABSTRACT

Disclosed herein is a method for executing unprotected mode services in a protected mode computing environment includes initiating a protected mode service that is configured to execute in a protected mode. Further, the method includes verifying an integrity of one or more unprotected mode services configured to execute in an unprotected mode. The one or more unprotected mode services is registered with the protected mode service. The method also includes initiating an unprotected mode service of the one or more unprotected mode services in response to the integrity of the unprotected mode service being verified.

20 Claims, 7 Drawing Sheets

(56) References Cited

U.S. PATENT DOCUMENTS

| | | | |
|---|---|---|---|
| 2010/0043061 A1 | 2/2010 | Martin et al. | |
| 2011/0113427 A1* | 5/2011 | Dotan | G06F 21/53 718/1 |
| 2011/0179477 A1 | 7/2011 | Starnes et al. | |
| 2012/0009951 A1 | 1/2012 | Poland | |
| 2014/0380058 A1* | 12/2014 | Agarwal | H04L 9/083 713/716 |
| 2014/0380501 A1 | 12/2014 | Niss | |
| 2015/0052616 A1* | 2/2015 | Hutchison | G06F 21/53 726/27 |

OTHER PUBLICATIONS

Salter et al., Toward a Secure System Engineering Methodology, http://www.schneier.com/paper-secure-methodology.pdf, New Security Paradigms Workshop, Sep. 1998, pp. 2-10.

European Search Report for Application No. 15151215.9 dated Jun. 19, 2015.

Extended European Search Report, Patent Application No. 14181019.2 dated Dec. 15, 2014.

Office Action Summary, U.S. Appl. No. 13/975,936 dated Dec. 19, 2014.

Office Action for U.S. Appl. No. 13/975,936 dated Nov. 4, 2015.

* cited by examiner

EXECUTING UNPROTECTED MODE SERVICES IN A PROTECTED MODE ENVIRONMENT

FIELD

This disclosure relates to executing services in a protected mode computing environment, and more particularly to cryptographically securing unprotected mode services for executing in a protected mode computing environment.

BACKGROUND

In general, computing systems can execute in various modes of operation. Some examples of different computing modes include protected mode, unprotected mode, supervisor mode, user mode, kernel mode, etc. In a protected mode environment, the operating system limits the set of functions of the computing system available to processes running on the system. For example, the operating system may not allow protected mode processes to access the networking capabilities of the system. However, it may be desirable to access functions of a computing system running in protected mode that are not usually available to protected mode processes.

SUMMARY

The subject matter of the present application has been developed in response to the present state of the art, and in particular, in response to the problems and needs of executing unprotected mode services in a protected mode environment to securely communicate with systems running in a protected mode environment that have not yet been fully solved by currently available systems. For example, although conventional computing systems may require specific hardware and software components to connect to systems running in protected mode, they do not allow devices using commercial off-the-shelf ("COTS") hardware and software components to connect to the protected mode system because they are not trusted by the system. In general, the subject matter of the present application has been developed to provide a system that uses COTS hardware and software components to securely communicate with services running in protected mode computing systems that overcomes at least some of the above-discussed shortcomings of the prior art.

According to one embodiment, a method for executing unprotected mode services in a protected mode computing environment includes initiating a protected mode service that is configured to execute in a protected mode. Further, the method includes verifying an integrity of one or more unprotected mode services configured to execute in an unprotected mode. The one or more unprotected mode services is registered with the protected mode service. The method also includes initiating an unprotected mode service of the one or more unprotected mode services in response to the integrity of the unprotected mode service being verified.

In some implementations, the method additionally includes registering the one or more unprotected mode services with the protected mode service. A unique identifier associated with an unprotected mode service of the one or more unprotected mode services can be registered with the protected mode service. The method may also include generating the unique identifier, where the unique identifier includes a digital signature associated with the unprotected mode service. The digital signature can include a cryptographic hash of one or more of an executable representing the unprotected mode service and a predefined digital certificate associated with the unprotected mode service.

According to some implementations of the method, verifying the integrity of the one or more unprotected mode services includes checking if a unique identifier associated with an unprotected mode service matches a previously registered unique identifier associated with the unprotected mode service. The integrity of the unprotected mode service can be verified by the protected mode service. In some implementations, an unprotected mode service not having a unique identifier matching the previously registered unique identifier associated with the unprotected mode service is not initiated.

In certain implementations of the method, the protected mode service initiates the verified unprotected mode services such that the verified unprotected mode services are child processes of the protected mode service. The protected mode service and the one or more unprotected mode services can be initiated at boot time.

According to some implementations, the method further includes initiating a secure boot process at boot time. The secure boot process can include initiating the protected mode service in response to the protected mode service being registered with the secure boot process. The secure boot process may include an early launch anti-malware driver.

In certain implementations of the method, the one or more unprotected mode services includes one or more of a graphical user interface, a backoffice service, a trusted platform module service, and an access control service. The protected mode service and the one or more unprotected mode services can be executed on a mobile device.

According to another embodiment, an apparatus for executing unprotected mode services in a protected mode computing environment includes a processor and memory. The memory stores machine readable code executable by the processor. The machine readable code includes a protected mode module, an integrity module, and an unprotected mode module. The protected mode module initiates a protected mode service that is configured to execute in protected mode. The integrity module verifies the integrity of one or more unprotected mode services that are configured to execute in unprotected mode. The one or more unprotected mode services are registered with the protected mode service. The unprotected mode module initiates an unprotected mode service of the one or more unprotected mode services in response to the integrity of the unprotected mode service being verified.

In some implementations, the machine readable code further includes an enlisting module that registers the one or more unprotected mode services with the protected mode service. A unique identifier associated with an unprotected mode service of the one or more unprotected mode services is registered with the protected mode service. The machine readable code may also include an identifier module that generates the unique identifier. The unique identifier can include a digital signature associated with the unprotected mode service. The digital signature may include a cryptographic hash of one or more of an executable representing the unprotected mode service and a predefined digital certificate associated with the unprotected mode service.

According to certain implementations of the apparatus, the integrity module verifies the integrity of the one or more unprotected mode services by checking if a unique identifier associated with an unprotected mode service matches a previously registered unique identifier associated with the unprotected mode service. The integrity of the unprotected mode service can be verified by the protected mode service. An unprotected mode service not having a unique identifier matching the previously registered unique identifier associated with the unprotected mode service is not initiated in some implementations.

In some implementations of the apparatus, the protected mode service initiates the verified unprotected mode services such that the verified unprotected mode services are child processes of the protected mode service. The protected mode service and the one or more unprotected mode services can be initiated at boot time. In certain implementations, the machine readable code also includes a secure boot module that initiates a secure boot process at boot time. The secure boot process includes initiating the protected mode service in response to the protected mode service being registered with the secure boot process.

According to yet another embodiment, a system for executing unprotected mode services in a protected mode computing environment includes a mobile device that has a processor and a memory that stores machine readable code executable by the processor. The machine readable code includes a secure boot module that initiates a secure boot process at boot time of the mobile device. The secure boot process includes initiating a protected mode service configured to execute in protected mode in response to the protected mode service being registered with the secure boot process. The machine readable code also includes an integrity module that verifies an integrity of one or more unprotected mode services configured to execute in unprotected mode. The one or more unprotected mode services is registered with the protected mode service. Additionally, the machine readable code includes an unprotected mode module that initiates an unprotected mode service of the one or more unprotected mode services in response to the integrity of the unprotected mode service being verified.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
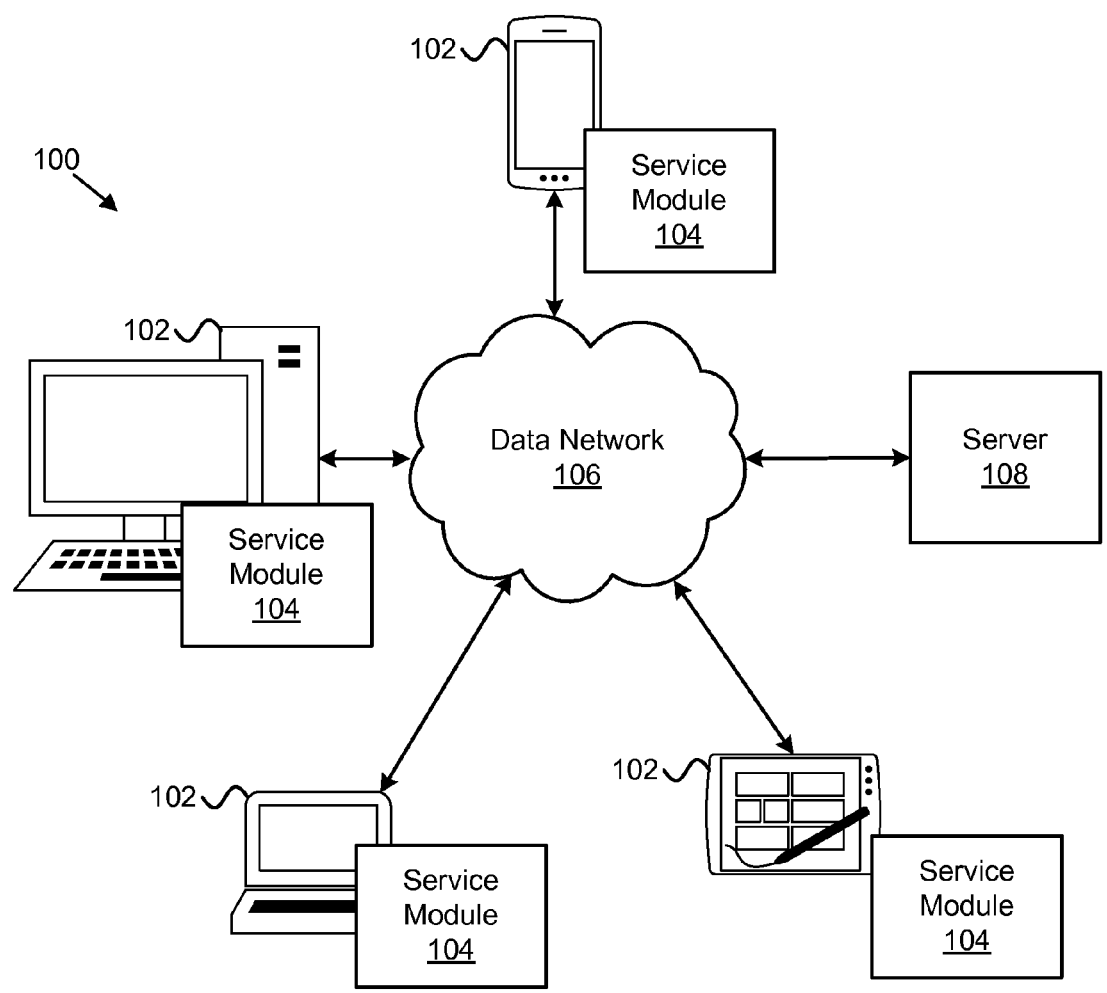
FIG. 1 is a schematic block diagram illustrating one embodiment of a system for executing unprotected mode services in a protected mode environment.

FIG. 1 illustrates one embodiment of a system 100 for executing unprotected mode services in a protected mode environment. The system 100, in certain embodiments, includes information handling devices 102, service modules 104, digital communication networks 106, and servers 108, which are described in more detail below.

The information handling devices 102, in one embodiment, includes mobile devices, such as smart phones, tablet computers, laptops, optical head mounted displays, smart watches, and/or the like. In another embodiment, the information handling devices 102 include desktop computers, servers, and/or the like. In some embodiments, the information handling devices 102 include operating systems, such as various versions of mobile and desktop operating systems provided by Microsoft®, Apple®, Linux, Android, and/or the like. For example, the information handling devices 102 may include a tablet running a version of Apple® iOS, a smart phone running a version of Windows® Mobile, and a laptop running a distribution of Linux.

In a further embodiment, the information handling devices 102 are configured to execute various services and/or programs, such as productivity applications, Internet applications, email clients, and/or the like. In one embodiment, the information handling devices 102 include various execution modes, such as protected mode, unprotected mode, safe mode, kernel mode, user mode, supervisor mode, and/or the like. For example, an information handling device 102 running in protected mode may only provide certain functionality to programs, e.g., graphical user interface, networking, and/or the like functionality may not be available to programs running in protected mode. Alternatively, an information handling device 102 running in unprotected mode may provide a full range of functionality to programs running in unprotected mode. Similarly, certain programs may be configured to execute in one or more modes. For example, an email client configured to only run in unprotected mode may not be initiated by an information handling device 102 running in protected mode.

In another embodiment, the system 100 includes a service module 104. The service module 104, in one embodiment, initiates a protected mode service at boot time, verifies the integrity of one or more unprotected mode services registered with the protected mode service, and initiates the verified unprotected mode services. In certain embodiments, the service module 104 includes a plurality of modules that perform the operations of the service module 104. The service module 104, with its accompanying modules, is described in more detail with reference to FIGS. 2 and 3.

The system 100, in a further embodiment, includes a data network 106. The data network 106, in certain embodiments, is a digital communication network 106 that transmits digital communications between the information handling devices 102 and/or the servers 108. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

In another embodiment, the system 100 includes servers 108. The servers 108, in one embodiment, include main frame computers, desktop computers, laptop computers, cloud servers, smart phones, tablet computers, and/or the like. In one embodiment, the information handling devices 102 are communicatively coupled to the servers 108 through the data network 106. In another embodiment, the information handling devices 102 access data stored on the servers 108 through the data network 106.

Figure 2:
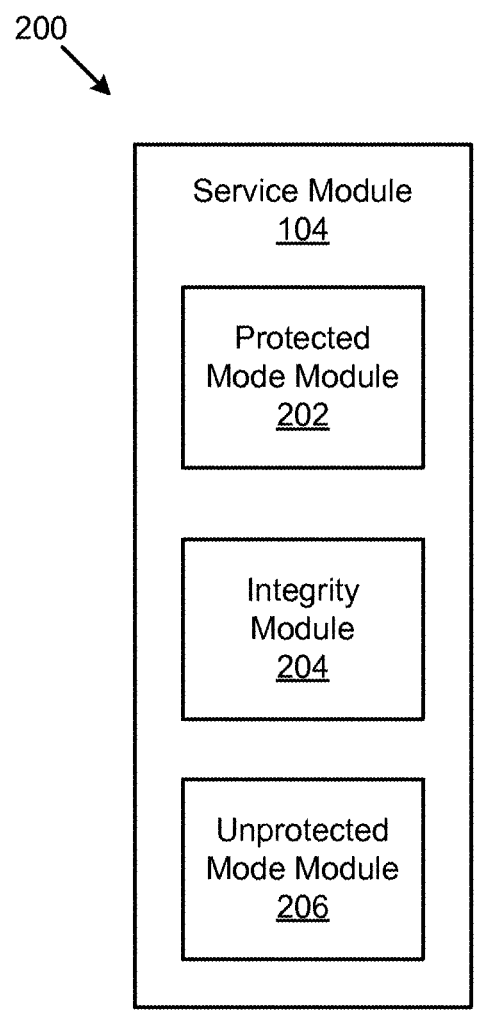
FIG. 2 is a schematic block diagram illustrating one embodiment of a service module.

FIG. 2 illustrates one embodiment of a module 200 for executing unprotected mode services in a protected mode environment. In one embodiment, the module 200 includes an embodiment of a service module 104. In certain embodiments, the service module 104 includes a protected mode module 202, an integrity module 204, and an unprotected mode module 206, which are described in more detail below.

In one embodiment, the protected mode module 202 initiates a service configured to execute in protected mode. In certain embodiments, the protected mode module 202 initiates the protected mode service at boot time, start-up, and/or the like, of the information handling device 102. In one embodiment, the protected mode module 202 initiates a plurality of protected mode services. In another embodiment, a protected mode service is provided with a limited set of functionalities available on the system. In some embodiments, the protected mode service adheres to a rigorous and restrictive set of system supplied and trusted APIs and libraries. For example, a protected mode service may not be allowed to access the networking capabilities of the information handling device 102, the graphical user interface capabilities of the information handling device 102, and/or the like.

In certain embodiments, the protected mode service initiates one or more child processes. In some embodiments, the child processes include protected mode services and/or unprotected mode services. Unprotected mode services may not be constrained to the restrictions of the protected mode service. Thus, unprotected mode services may be allowed, in one example, to access the networking capabilities of the information handling device 102, the graphical user interface functionality or the information handling device 102, and/or the like.

In some embodiments, a protected mode service initiates one or more child processes in response to the child processes being registered with the protected mode service. In one embodiment, the protected mode module 202 receives registration information from services that are initiated as child processes by the protected mode service. In some embodiments, the registration information includes a unique identifier associated with a service, such as a hash value, or the like. In this manner, the protected mode service knows which services to initiate as child processes. In some embodiments where the information handling device 102 is running in protected mode, the protected mode service initiates unprotected mode services that have registered with the protected mode service because the protected mode service knows that the unprotected mode services are trusted. This creates a chain-of-trust from the protected mode service to the unprotected mode services because, even though the unprotected mode services would generally not be allowed to execute in protected mode, the protected mode service knows the unprotected mode services are trusted because they have registered with, and have been verified by, the protected mode service as trusted services.

In another embodiment, the service apparatus includes an integrity module 204 that verifies the integrity of one or more unprotected mode services that are registered with the protected mode service. In certain embodiments, the integrity module 204 verifies the integrity of the unprotected mode services by checking if a unique identifier associated with the unprotected mode service matches a previously registered unique identifier associated with the unprotected mode service. Thus, the integrity module 204, in some embodiments, verifies that the registered unprotected mode service has not been modified since the last time it registered with the protected mode service. If the unprotected mode service has been modified, the unique identifier associated with the unprotected mode service may be different, which would signal to the protected mode service that the unprotected mode service is different and should not be trusted. If the integrity module 204, in one embodiment, determines the unique identifiers do not match, the protected mode service ignores the unprotected mode service and does not initiate it as a child process.

In some embodiments, the integrity module 204 performs an audit of the system to get the current unique identifiers associated with the unprotected mode services that have registered with the protected mode service. In another embodiment, the integrity module 204 receives registration information, e.g., a unique identifier, from unprotected mode services requesting initiation by the protected mode service and stores the information with the protected mode service. In some embodiments, unprotected mode services that register with the protected mode service include digital certificates verifying that the unprotected mode services have been granted permission to be initiated in the protected mode environment. The registration process is described below with reference to the index module 302.

In certain embodiments, the integrity module 204 maintains a list of registered services with their unique identifiers. As described below, in some embodiments, the unique identifier comprises a generated hash based on information specific to the unprotected mode service. For example, a hash associated with an unprotected mode service may be generated using a hash function that takes certain parameters, such as the service's name, an identifier for the executable, a digital certificate associated with the service, and/or the like. By using a hash of service-specific information, the integrity module 204 can easily determine whether the unprotected mode service has been modified because any changes in the information associated with the unprotected mode service would change the generated hash value.

In some embodiments, the integrity module 204 maintains a hash table comprising key-value pairs, where the hash value is the key and the unprotected mode service, or a value that identifies the unprotected mode service, is the value. In this manner, the integrity module 204 may quickly lookup a hash value in the hash table to determine if the unprotected mode service has been registered, has been modified, and/or the like. In some embodiments, if no value is returned for a given hash value key, i.e., there is not an unprotected mode service associated with the given hash value, the unprotected mode service associated with the given hash value is ignored or not allowed to be executed.

In another embodiment, the service module 104 includes an unprotected mode module 206 that initiates an unprotected mode service of the one or more unprotected mode services in response to the integrity module 204 verifying the integrity of the unprotected mode service. In some embodiments, the unprotected mode module 206 initiates the unprotected mode services at boot time, start-up, or the like, of the information handling device 102. In one embodiment, the unprotected mode services initiated by the unprotected mode module 206 include a BackOffice service, a trusted platform module service, an access control service, a graphical user interface service, and/or the like.

As described above, the unprotected mode module 206 initiates services that are not configured to execute in protected mode. In some embodiments, the unprotected mode services require functionality that is generally not available in protected mode, such as networking capabilities, graphical user interface capabilities, and/or the like. Thus, an information handling device 102 running in protected mode would usually not initiate an unprotected mode service because the unprotected mode service may attempt to access particular functions or features that could compromise the integrity of the information handling device 102.

However, as long as the unprotected mode services register with the protected mode service, the unprotected mode services may be initiated as child processes of the protected mode service without compromising the integrity of the system. The integrity of the system is not compromised because the protected mode service, which is a trusted service, initiates the unprotected mode services as child processes, which indicates the protected mode service trusts the unprotected mode services that have registered with the protected mode service. For example, the BackOffice service, which may be an unprotected mode service because the BackOffice executable may require networking capabilities, may be initiated by the protected mode service and allowed to access the networking capabilities of the system because the trusted protected mode service trusts the unprotected BackOffice service. In this manner, the unprotected mode services may perform various activities that are outside the scope and restrictions of protected mode processes while ensuring the integrity of the system.

Figure 3:
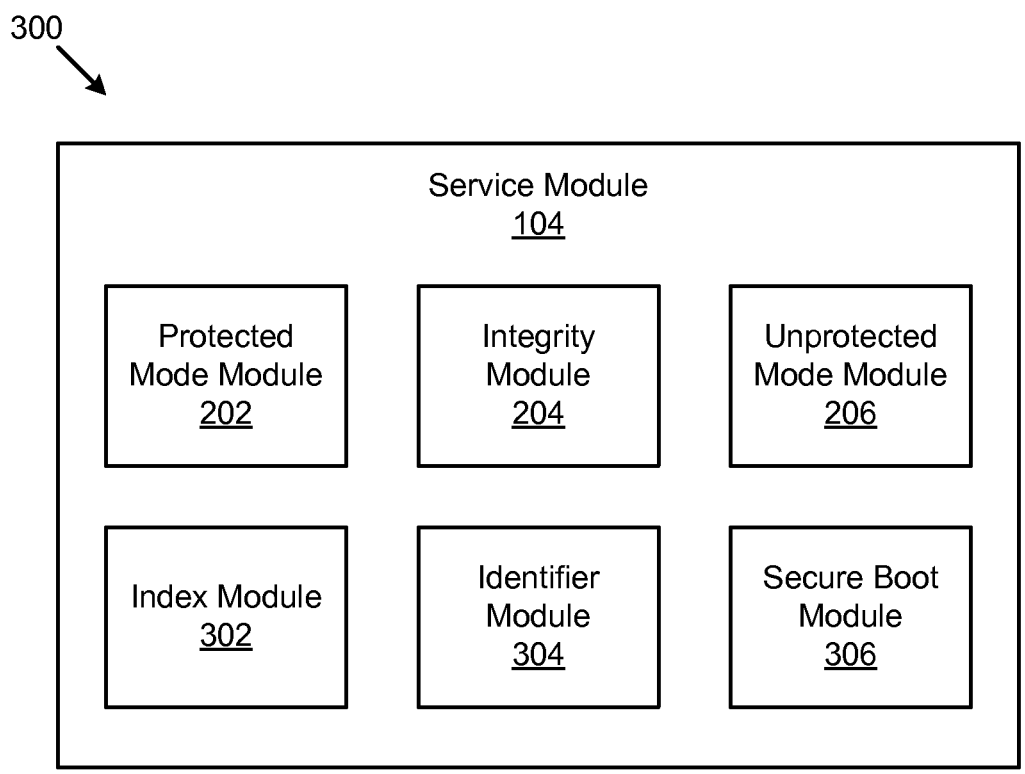
FIG. 3 is a schematic block diagram illustrating one embodiment of another service module.

FIG. 3 depicts another embodiment of a module 300 for executing unprotected mode services in a protected mode environment. In some embodiments, the module 300 includes an embodiment of a service module 104. The service module 104 includes a protected mode module 202, an integrity module 204, and an unprotected mode module 206, which are substantially similar to the protected mode module 202, the integrity module 204, and the unprotected mode module 206 described above with reference to the module 200 of FIG. 2. The service module 104 of the module 300, in one embodiment, also includes an index module 302, an identifier module 304, and a secure boot module 306, which are described in more detail below.

In one embodiment, the index module 302 registers one or more unprotected mode services with the protected mode service. In some embodiments, the index module 302 registers with the protected mode service a unique identifier associated with the unprotected mode service. In some embodiments, the index module 302 inserts the unique identifier into a data structure accessible by the protected mode service, such as a lookup table, a database, and/or the like. In another embodiment, as described above, the integrity module 204 receives the unique identifier and registers the unique identifier with the protected mode service. The unique identifier, in certain embodiments, identifies the unprotected mode service without identifying another unprotected mode service. The unique identifier, in some embodiments, includes a hash value, a digital signature, a fingerprint, a checksum, and/or the like, which may be based on one or more characteristics of the unprotected mode service, such as the name of the service, an identifier of the executable, a digital certificate associated with the service, and/or the like.

The service module 104 of the module 300, in another embodiment, includes an identifier module 304 that generates the unique identifier. In some embodiments, the unique identifier generated by the identifier module 304 includes a digital signature associated with the unprotected mode service. In another embodiment, the digital signature includes a cryptographic hash generated using the executable representing the unprotected mode service, a predefined digital certificate associated with the unprotected mode service, the name of the service, a unique process identifier, and/or any combination of the above.

For example, using a predetermined hash function, the identifier module 304 may use a combination of the executable representing the unprotected mode service and a digital certificate assigned to the service to generate the hash value associated with the unprotected mode service. In one embodiment, the digital certificate includes a digital certificate published and signed by Boeing®. In this manner, the hash value will uniquely identify the unprotected mode service. The hash value, in some embodiments, is stored in the protected mode service such that it is accessible to the protected mode service—in particular the integrity module 204. For example, the hash value or digital signature can be bundled (e.g., compiled) with the executable of the protected mode service. Accordingly, when the protected mode service needs access to the hash value or digital signature, the hash value or digital signature is read from the executable of the protected mode service and stored in memory. As described above, the integrity module 204 maintains a list of hash values and their associated unprotected mode services in order to verify the integrity of the unprotected mode service that is attempting to be initiated as a child process of the protected mode service.

In some embodiments, if the hash value associated with an unprotected mode service that has been registered with the protected mode service does not match a current hash value associated with the same unprotected mode service, the protected mode service determines the unprotected mode service has been modified because the hash value has changed. Thus, the unprotected mode service is no longer a trusted unprotected mode service and the protected mode service does not initiate the unprotected mode service as a child process.

In a further embodiment, the service module 104 of the module 300 includes a secure boot module 306 that initiates a secure boot process at boot time. In some embodiments, the secure boot process initiates the protected mode service in response to the protected mode service being registered with the secure boot process. In another embodiment, the secure boot process checks the integrity of the protected mode service and allows it to be initiated. In certain embodiments, the secure boot process includes an Early Launch Anti-malware ("ELAM") driver that protects certain configurations and components during boot time by evaluating drivers/services that attempt to startup. In some embodiments, the secure boot module 306 launches the ELAM driver as one of the first drivers loaded during boot time such that the ELAM driver can evaluate each driver that is registered to be initiated at boot time.

The ELAM driver, in some embodiments, determines the protected mode service is a trusted service and allows the protected mode service to be initiated. In certain embodiments, the ELAM driver initiates the protected mode service. Subsequently, the protected mode service, in one embodiment, initiates one or more unprotected mode services that have registered with, and have been verified by, the protected mode service. In some embodiments, the ELAM driver does not know about the unprotected mode services initiated as child processes of the protected mode service. In this manner, the unprotected mode services are able to execute in a protected mode environment because they have been cryptographically signed and verified that they are trusted services by the protected mode service. In one embodiment, this creates a "chain of trust" between the secure boot process, e.g., the ELAM driver, the protected mode service, and the unprotected mode services that are initiated as trusted child processes of the protected mode service.

In one example embodiment, an airplane system running in protected mode may only communicate with devices running in protected mode to ensure the devices it is communicating with are trusted devices. In traditional airplane systems, the devices comprise specialized hardware and software that follow a rigorous configuration procedure. The problem with these devices, however, is that they can be expensive to purchase, manage, and maintain. Moreover, the hardware and software may rapidly become obsolete. These devices also may compromise the security of the airplane system because they are allowed to connect to the system based on a simple identity certificate.

The subject matter of the present disclosure, however, allows devices comprised of commercial off-the-shelf ("COTS") or general purpose computing components to verify the integrity of services that communicate with the protected mode airplane system. Thus, if an application running on a mobile device wishes to communicate with the airplane system to upload/download data, for example, the airplane system needs to verify the mobile device, and the applications running on the mobile device, are trusted and will not compromise the security of the airplane system. By utilizing a secure boot driver, e.g., an ELAM driver, to verify protected mode services are trusted, which in turn verifies the unprotected mode services are also trusted, the mobile device may utilize the expanded functionality of the mobile device while running in protected mode. This allows the mobile device to securely communicate with the protected mode airplane system to perform functions not usually permitted in a protected mode environment using COTS components.

Figure 4:
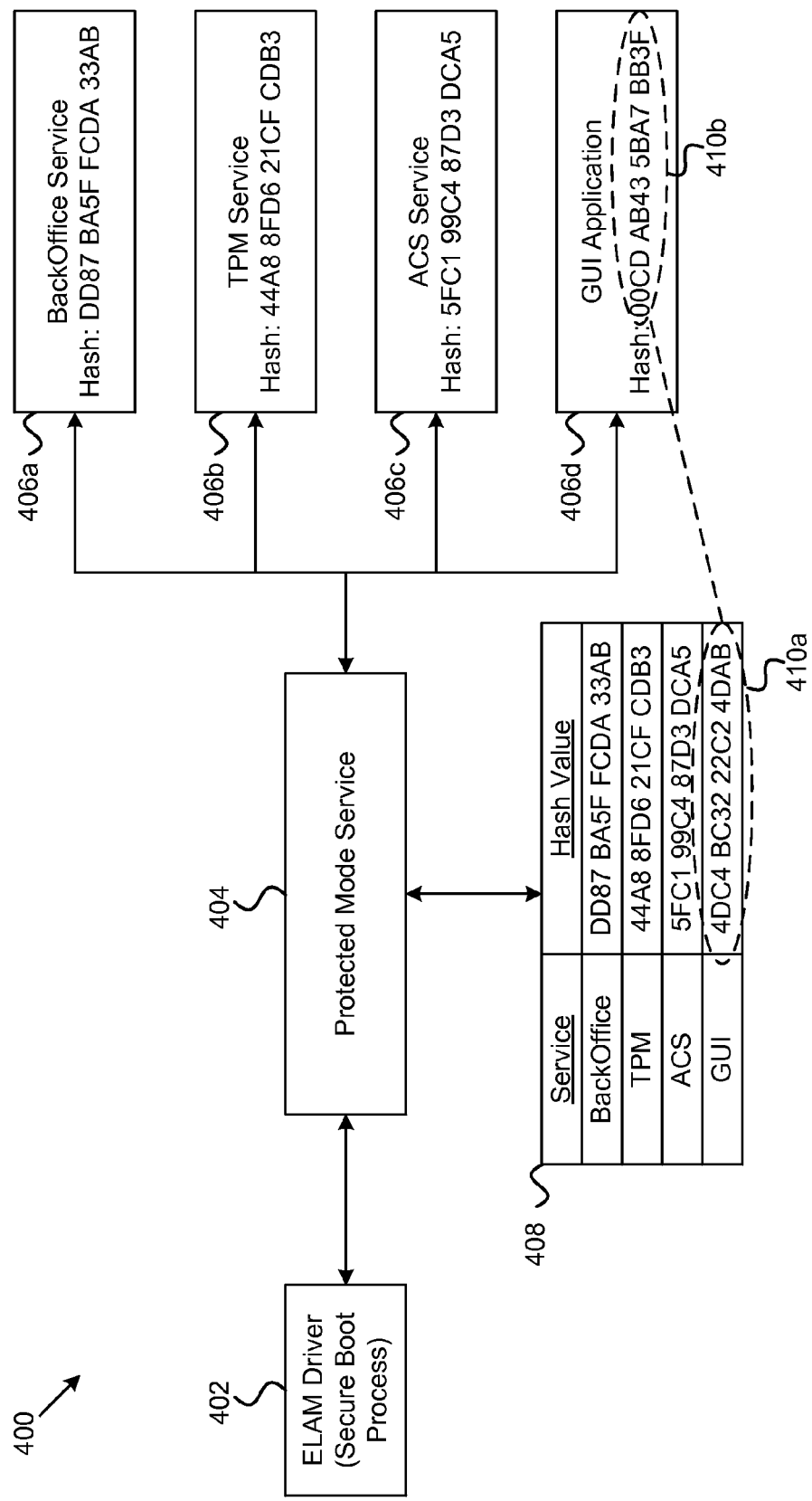
FIG. 4 is a schematic block diagram illustrating one embodiment of a system for executing unprotected mode services in a protected mode environment.

FIG. 4 depicts one embodiment of a system 400 for executing unprotected mode services in a protected mode environment. In one embodiment, the system 400 includes an ELAM driver 402, which is a secure boot process that launches at the beginning of the boot process, i.e., before other boot-start drivers. The system 400, in some embodiments, also includes a protected mode service 404, unprotected mode services 406a-d, and a hash table 408 comprising key-value pairs.

In the depicted embodiment, the ELAM driver 402 is launched first by the kernel, before any other drivers, including third-party software drivers in order to prevent unauthorized programs that may compromise the integrity of the system from executing. The ELAM driver 402, in certain embodiments, verifies the protected mode service 404 is an authorized service and, if so, initiates the protected mode service 404. In some embodiments, the protected mode module 202 initiates the protected mode service 404.

Upon being launched, in one embodiment, the protected mode service 404 checks if there are unprotected mode services 406a-d registered with the protected mode service to be initiated. In one embodiment, the protected mode service 404, in particular the integrity module 204, receives a digital signature (e.g., a hash value) from the unprotected mode services 406a-d and looks in a table 408 for the unprotected mode service associated with the received digital signature. If the integrity module 204 determines a value is returned for the given digital signature, then the unprotected mode service is determined to be a trusted service and will be initialized as a child process of the protected mode service.

If no value is returned for the given digital signature, such as when the provided digital signature does not match any digital signatures in the table 408, the unprotected mode service associated with the digital signature is ignored. For example, if a hash value 410b associated with the GUI Application 406d does not match a previously registered hash value 410a in the table 408, the integrity module 204 determines the integrity of the GUI Application has not be verified. Thus, because the GUI Application has been modified (as evidenced by the difference in the provided hash value 410b and the hash value 410a in the table), it is no longer a trusted unprotected mode service and the unprotected mode module 206 will not initiate the process as a child process of the protected mode service 404.

Figure 5:
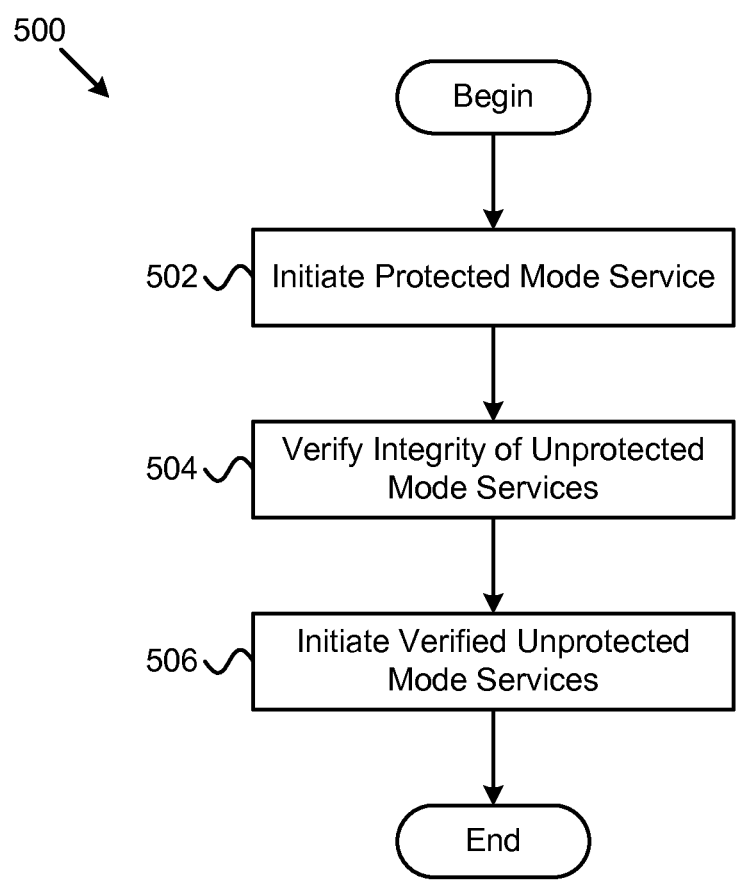
FIG. 5 is a schematic flow diagram illustrating one embodiment of a method for executing unprotected mode services in a protected mode environment.

FIG. 5 depicts one embodiment of a method 500 for executing unprotected mode services in a protected mode environment. In one embodiment, the method 500 begins and a protected mode module 202 initiates 502 a protected mode service. In another embodiment, an integrity module 204 verifies 504 the integrity of one or more unprotected mode services that have registered with the protected mode service. In a further embodiment, an unprotected mode module 206 initiates 506 an unprotected mode service of the one or more unprotected mode services in response to the integrity module 204 verifying the integrity of the unprotected mode service, and the method 500 ends.

Figure 6:
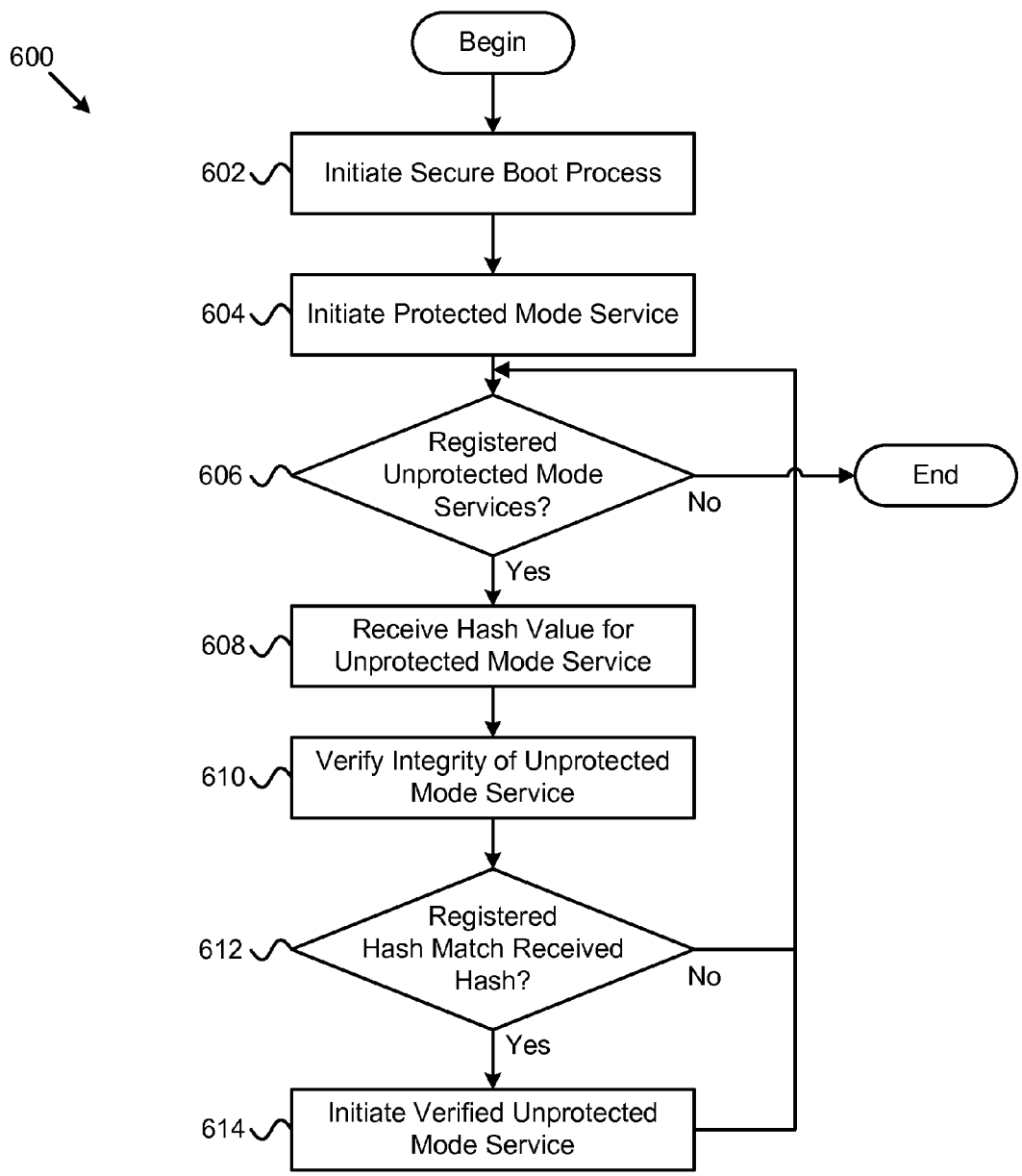
FIG. 6 is a schematic flow diagram illustrating one embodiment of another method for executing unprotected mode services in a protected mode environment.

FIG. 6 depicts one embodiment of another method 600 for executing unprotected mode services in a protected mode environment. In one embodiment, the method 600 begins and a secure boot module 306 initiates 602 a secure boot process.

In some embodiments, the secure boot process includes an ELAM driver that is launched at boot time before other boot-start drivers and programs. In a further embodiment, a protected mode module 202 initiates 604 a protected mode service. In some embodiments, the protected mode module 202 initiates 604 the protected mode service in response to the secure boot module 306 determining the protected mode service is registered to be initiated. In another embodiment, the ELAM driver initiates 604 the protected mode service. In some embodiments, the ELAM driver allows the protected mode service to be initiated.

In another embodiment, an integrity module 204 determines 606 if there are any unprotected mode services registered to be initiated. If the integrity module 204 determines 606 that there are unprotected mode services registered, the integrity module 204 receives 608 a digital signature/hash value from a registered unprotected mode service and verifies 610 the integrity of the unprotected mode service. In order to verify 610 the integrity, in one embodiment, the integrity module 204 determines 612 if the received digital signature/hash value matches the previously registered digital signature/hash value. If the integrity module 204 determines 612 the received digital signature/hash value does match the previously registered digital signature/hash value associated with the unprotected mode service, an unprotected mode module 206 initiates 614 the unprotected mode service as a child process of the protected mode service. In such an embodiment, this creates a "chain of trust" between the secure boot process, the protected mode service, and the unprotected mode service.

If the integrity module 204 determines 612 the received digital signature/hash value does not match the previously registered digital signature/hash value associated with the unprotected mode service, the unprotected mode service associated with the received digital signature/hash value is not initiated. If the integrity module 204 determines 606 that there are no more registered unprotected mode services, the method 600 ends.

Figure 7:
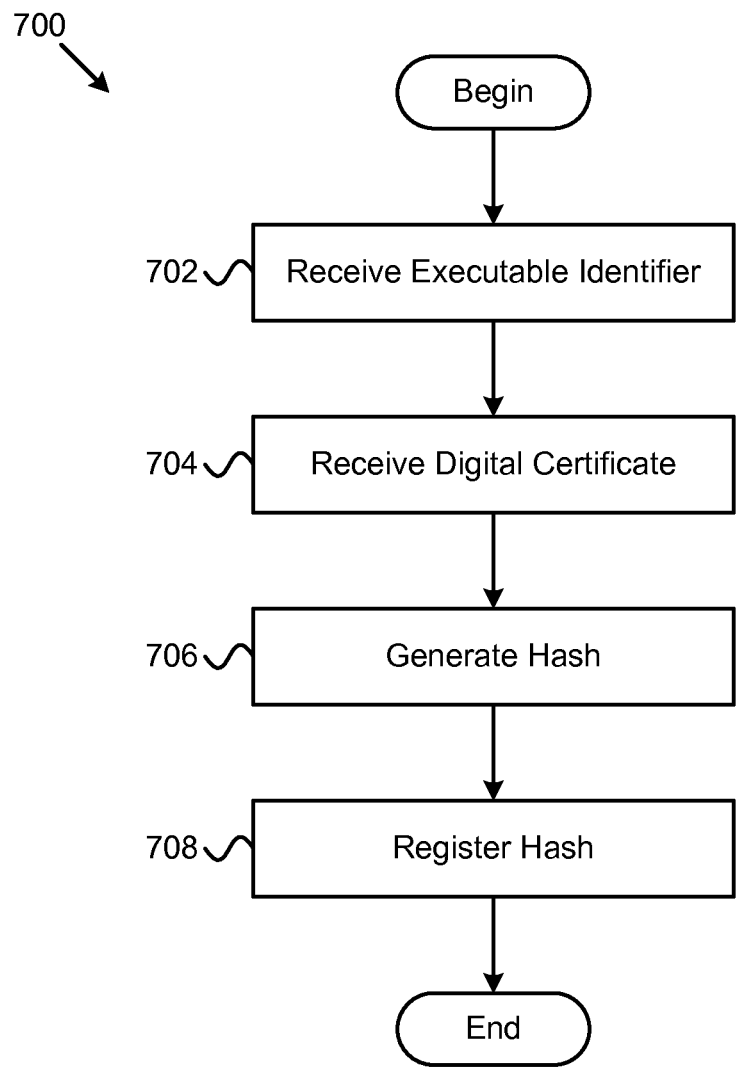
FIG. 7 is a schematic flow diagram illustrating one embodiment of a method for executing unprotected mode services in a protected mode environment.

FIG. 7 depicts one embodiment of a method 700 for executing unprotected mode services in a protected mode environment. In one embodiment, the method 700 begins and the identifier module 304 receives 702 an executable identifier associated with an unprotected mode service. In another embodiment, the identifier module 304 also receives 704 a digital certificate associated with the unprotected mode service. In one embodiment, the digital certificate includes a digital certificate published and signed by Boeing®. The identifier module 304, in certain embodiments, using the received executable identifier and the received digital certificate, generates 706 a unique digital signature/hash value for the associated unprotected mode service. In one embodiment, the identifier module 304 uses a predetermined hash function to generate the digital signature/hash value using the executable identifier and the digital certificate.

In a further embodiment, an index module 302 registers 708 the digital signature/hash value generated 706 by the identifier module 304 with a protected mode service such that the unprotected mode service associated with the digital signature/hash value will be initiated by the protected mode service. In certain embodiments, the integrity module 204 receives the digital signature/hash value from the index module 302 in response to a performed audit of the system. Thus, during the audit, the integrity module 204 may determine the unprotected mode service requests to be initiated by the protected mode service and receives the generated digital signature/hash value from the index module 302, and the method 700 ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method for executing unprotected mode services in a protected mode computing environment, the method comprising:
    initiating a protected mode service configured to execute in a protected mode;
    verifying an integrity of one or more unprotected mode services configured to execute in an unprotected mode, the one or more unprotected mode services being registered with the protected mode service;
    initiating an unprotected mode service of the one or more unprotected mode services in response to the integrity of the unprotected mode service being verified, the unprotected mode service being executed as a child process of the protected mode service and at least one of the method steps is implemented by a hardware processor.

2. The method of claim 1, further comprising registering the one or more unprotected mode services with the protected mode service, wherein a unique identifier associated with an unprotected mode service of the one or more unprotected mode services is registered with the protected mode service.

3. The method of claim 2, further comprising generating the unique identifier, wherein the unique identifier comprises a digital signature associated with the unprotected mode service.

4. The method of claim 3, wherein the digital signature comprises a cryptographic hash of one or more of an executable representing the unprotected mode service and a predefined digital certificate associated with the unprotected mode service.

5. The method of claim 1, wherein verifying the integrity of the one or more unprotected mode services comprises checking if a unique identifier associated with an unprotected mode service matches a previously registered unique identifier associated with the unprotected mode service, wherein the integrity of the unprotected mode service is verified by the protected mode service.

6. The method of claim 5, wherein an unprotected mode service not having a unique identifier matching the previously registered unique identifier associated with the unprotected mode service is not initiated.

7. The method of claim 1, wherein verifying an integrity of one or more unprotected mode services provides verified unprotected mode services, and wherein the protected mode service initiates the verified unprotected mode services such that the verified unprotected mode services are child processes of the protected mode service.

8. The method of claim 1, wherein the protected mode service and the one or more unprotected mode services are initiated at boot time.

9. The method of claim 1, further comprising initiating a secure boot process at boot time, the secure boot process initiating the protected mode service in response to the protected mode service being registered with the secure boot process.

10. The method of claim 9, wherein the secure boot process comprises an early launch anti-malware driver.

11. The method of claim 1, wherein the one or more unprotected mode services includes one or more of a graphical user interface, a backoffice service, a trusted platform module service, and an access control service.

12. The method of claim 1, wherein the protected mode service and the one or more unprotected mode services are executed on a mobile device.

13. An apparatus for executing unprotected mode services in a protected mode computing environment, the apparatus comprising:
    a processor;
    a memory that stores machine readable code executable by the processor, the machine readable code comprising:
        a protected mode module that initiates a protected mode service configured to execute in protected mode;
        an integrity module that verifies an integrity of one or more unprotected mode services configured to execute in unprotected mode, the one or more unprotected mode services being registered with the protected mode service; and
        an unprotected mode module that initiates an unprotected mode service of the one or more unprotected mode services in response to the integrity of the unprotected mode service being verified, the unprotected mode service being executed as a child process of the protected mode service.

14. The apparatus of claim 13, further comprising an enlisting module that registers the one or more unprotected mode services with the protected mode service, wherein a unique identifier associated with an unprotected mode service of the one or more unprotected mode services is registered with the protected mode service.

15. The apparatus of claim 14, further comprising an identifier module that generates the unique identifier, wherein the unique identifier comprises a digital signature associated with the unprotected mode service, and wherein the digital signature comprises a cryptographic hash of one or more of an executable representing the unprotected mode service and a predefined digital certificate associated with the unprotected mode service.

16. The apparatus of claim 13, wherein the integrity module verifies the integrity of the one or more unprotected mode services by checking if a unique identifier associated with an unprotected mode service matches a previously registered unique identifier associated with the unprotected mode service, wherein the integrity of the unprotected mode service is verified by the protected mode service.

17. The apparatus of claim 16, wherein an unprotected mode service not having a unique identifier matching the previously registered unique identifier associated with the unprotected mode service is not initiated.

18. The apparatus of claim 13, wherein the integrity module verifies the integrity of the one or more unprotected mode services to provide verified unprotected mode services, and wherein the protected mode service initiates the verified unprotected mode services such that the verified unprotected mode services are child processes of the protected mode service, and wherein the protected mode service and the one or more unprotected mode services are initiated at boot time.

19. The apparatus of claim 13, further comprising a secure boot module that initiates a secure boot process at boot time, the secure boot process initiating the protected mode service in response to the protected mode service being registered with the secure boot process.

20. A system for executing unprotected mode services in a protected mode computing environment, the system comprising:
- a mobile device comprising a processor and a memory that stores machine readable code executable by the processor, the machine readable code comprising:
  - a secure boot module that initiates a secure boot process at boot time of the mobile device, the secure boot process initiating a protected mode service configured to execute in protected mode in response to the protected mode service being registered with the secure boot process;
  - an integrity module that verifies an integrity of one or more unprotected mode services configured to execute in unprotected mode, the one or more unprotected mode services being registered with the protected mode service; and
  - an unprotected mode module that initiates an unprotected mode service of the one or more unprotected mode services in response to the integrity of the unprotected mode service being verified, the unprotected mode service being executed as a child process of the protected mode service.

* * * * *